United States Patent [19]

Leino

[11] Patent Number: 4,991,672
[45] Date of Patent: Feb. 12, 1991

[54] AUTOMATIC CONTROL SYSTEM FOR THE TRANSFER OF THE DRIVE POWER BETWEEN A TRACTOR AND A TRAILER

[75] Inventor: Reijo Leino, Lappeenranta, Finland

[73] Assignee: Orion-Yhtyma Oy Normet, Finland

[21] Appl. No.: 424,290

[22] PCT Filed: Mar. 10, 1989

[86] PCT No.: PCT/FI89/00044
§ 371 Date: Oct. 25, 1989
§ 102(e) Date: Oct. 25, 1989

[87] PCT Pub. No.: WO89/09352
PCT Pub. Date: Oct. 5, 1989

[30] Foreign Application Priority Data

Mar. 25, 1988 [FI] Finland .................................. 881439

[51] Int. Cl.$^5$ ........................ B62D 59/02; B62D 55/00
[52] U.S. Cl. .................................... 180/14.3; 180/307; 180/308; 60/421
[58] Field of Search ............... 180/305, 307, 308, 242, 180/14.2, 14.3, 9.1; 60/420, 421, 423, 426, 484

[56] References Cited

U.S. PATENT DOCUMENTS

| | | | |
|---|---|---|---|
| 3,747,722 | 7/1973 | Finney | 180/305 X |
| 3,817,341 | 6/1974 | Greene | 180/308 X |
| 3,910,369 | 10/1975 | Chichester et al. | 180/307 X |
| 4,027,738 | 6/1977 | Lundin | 180/307 X |
| 4,369,855 | 1/1983 | Buschbom et al. | 180/212 |
| 4,396,087 | 8/1983 | Rock et al. | 180/307 X |
| 4,542,990 | 9/1985 | Fouquet | 366/61 |

FOREIGN PATENT DOCUMENTS

| | | | |
|---|---|---|---|
| 0054500 | 6/1982 | European Pat. Off. | 180/307 |
| 0666677 | 12/1982 | European Pat. Off. | 180/14.3 |
| 0096621 | 12/1983 | European Pat. Off. | 180/307 |
| 3628175 | 12/1987 | Fed. Rep. of Germany | . |
| 8807150 | 9/1988 | PCT Int'l Appl. | . |

Primary Examiner—Charles A. Marmor
Assistant Examiner—Brian L. Johnson
Attorney, Agent, or Firm—Steinberg & Raskin

[57] ABSTRACT

The invention concerns an automatic control system for the transfer of the drive power between a tractor (10) and a trailer (11), which system comprises a closed hydraulic circuit (43) that operates the drive wheels of the tractor (10) and an open hydraulic circuit (25) that operates the drive wheels (17a, 17b) of the trailer. In the system, the closed hydraulic circuit (43) of the tractor (10) includes a pump (15) and a hydraulic motor (16) driven by the pump and, in a corresponding way, the open hydraulic circuit (25) of the trailer (11) comprises a motor or motors (21a, 21b) driven by a pump (20). The control system comprises a line (42) that transmits a control pressure ($P_2$) from the closed circuit (43) of the tractor (10) to the open circuit (25) of the trailer (11). When the resistance to traction increases, e.g. when driving up a steep hill, the pressure ($P_2$) in the transmitting line (42) increases and, because of this pressure ($P_2$), the hydraulic pump (20) of the trailer (11), which is preferably an adjustable-displacement pump, is controlled to produce a higher pressure for the motor or motors (21a and/or 21b) driven by the pump. In a corresponding way, when the drive power requirement of the tractor (10) becomes lower, the operating pressure in the hydraulic circuit (27b, 29a, 29b, 28a, 28b) of the drive power transmission in the trailer (11) is lowered.

7 Claims, 5 Drawing Sheets

AUTOMATIC CONTROL SYSTEM FOR THE TRANSFER OF THE DRIVE POWER BETWEEN A TRACTOR AND A TRAILER

BACKGROUND OF THE INVENTION

The invention concerns an automatic control system for the transfer of the drive power between a tractor and a trailer.

High requirements are imposed on the systems for the transmission of drive power of vehicles intended for operation in severe cross-country conditions. The basic starting point is that, in a tractor-trailer combination that hauls heavy loads of timber, both the tractor and the trailer are provided with drive gears of their own. Thereat, in particular when there are hills in the terrain, a problem arises concerning how to made the drive power transmission systems of the tractor and of the trailer operate interdependently. When the drive power is lowered in the tractor, the drive power must also be lowered in the trailer. When this doesn't happen, the trailer pushes and, in the case of a combination provided with an articulated joint, there is a risk of the combination becoming folded at the middle. In a corresponding way, when the power requirement becomes higher in the tractor, the drive power must also increase in the trailer.

In Finnish Pat. Appl. No. 863464, a system for the control of the drive power transmission is disclosed, wherein the system consists of two circuits that are closed. This arrangement of equipment requires separate means that produce a signal for automatic effecting of the control. In Danish Pat. No. 1150/80, a system is disclosed wherein the tractor and the trailer do not have separate hydraulic circuits. The trailer employs the hydraulic system of the tractor, and the invention is based on a hydraulic clutch between the hydraulic motor and the drive wheels and on the control of said clutch. On the other hand, in British Pat. No. 1,260,438 a hydraulic circuit is disclosed wherein the control of this trailer drive takes place mechanically depending on the difference in speed between the tractor and the trailer. In the Swedish Pat. No. 396,323, a power transmission solution for a trailer is disclosed wherein the trailer is provided with a combustion engine of its own.

SUMMARY OF THE INVENTION

The object of the present invention is a power transmission system of an entirely novel type. wherein only one drive engine is used. The object is a power transmission system wherein it is possible to regulate the drive powers of the trailer and the tractor automatically and interdependently and such that, when the drive power becomes higher in the tractor, the drive power is increased accordingly in the trailer and, in a corresponding way, when the power requirement becomes lower in the tractor, the drive power is also lowered in the trailer.

The drive power transmission system in accordance with the invention is mainly characterized in that the control system comprises a line that transmits a control pressure from the closed circuit of the tractor to the open circuit of the trailer, whereby, when the resistance to traction increases, e.g. when driving up a steep hill, the pressure in this transmitting line increases and, by means of this pressure, the hydraulic pump of the trailer, which is preferably an adjustable-displacement pump, is controlled to produce a higher pressure to the motor or motors driven by the pump and, in a corresponding way, when the drive power requirement of the tractor becomes lower, the operating pressure in the hydraulic circuit of the drive power transmission in the trailer is lowered.

BRIEF DESCRIPTION OF THE DRAWINGS

In the following, the invention will be described with reference to some preferred embodiments of the invention shown in the Figures in the accompanying drawings, the invention being, however, not assumed to be confined to said embodiments alone.

DESCRIPTION OF THE PREFERRED EMBODIMENTS

Figure 1:
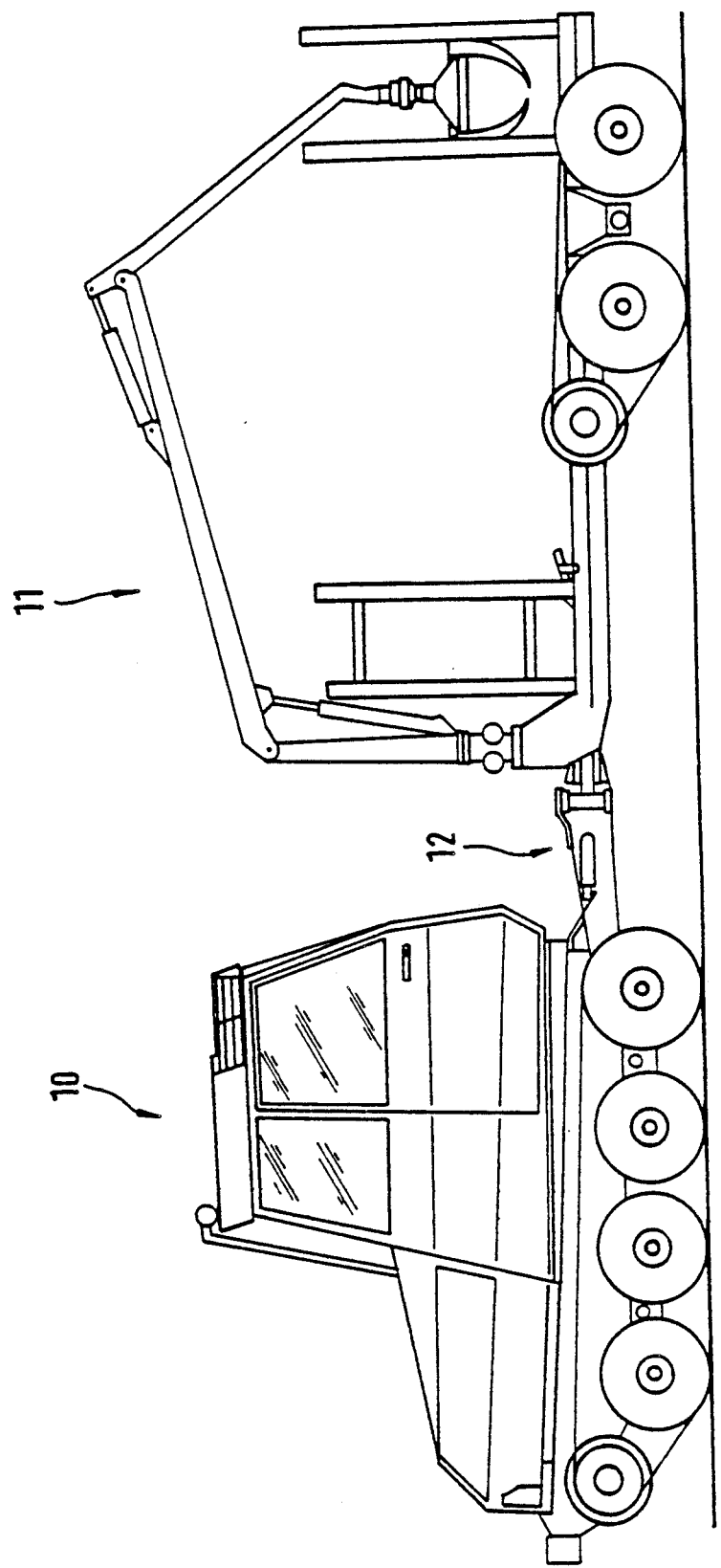
FIG. 1 is a side view of a tractor trailer combination.
Figure 2:
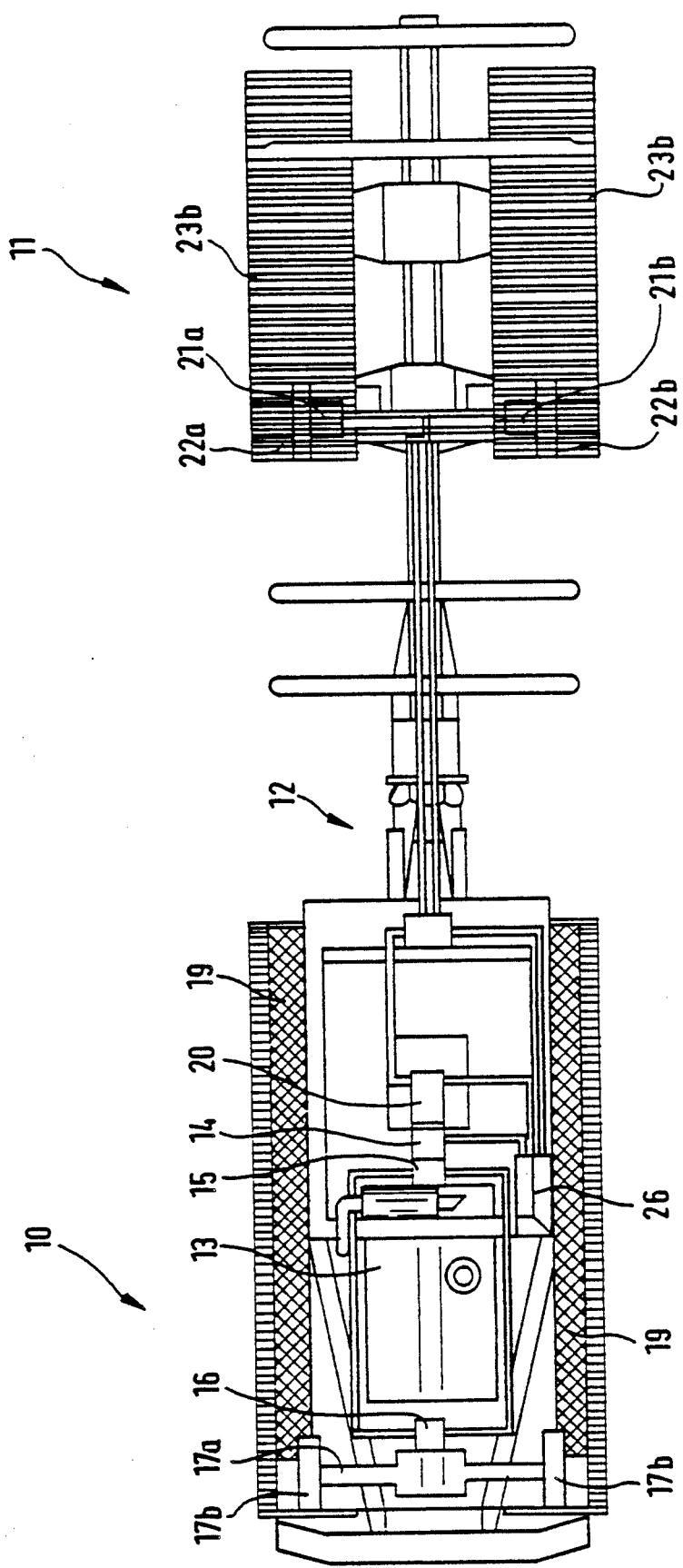
FIG. 2 shows the tractor trailer combination of FIG. 1 viewed from above, and the essential components of the drive power transmission system have been added to the figure schematically.

FIGS. 1 and 2 show a tractor-trailer combination. The tractor 10 and the trailer 11 are interconnected by means of an articulated joint 12. The drive engine 13, e.g. a combustion engine, favorably a diesel engine, is fitted to rotate the adjustable-displacement pump 15 of the power transmission of the tractor as well as the constant-displacement pump 14 that produces the feed and control pressure. The adjustable displacement pump 15 is further fitted to rotate the adjustable-displacement motor 16 of the tractor. The adjustable-displacement motor 16 rotates the drive shaft 17a and the drive wheel 17b of the tractor 10.

The drive wheels 17b rotate and drive a crawler 19 or the equivalent.

The drive engine 13 is also fitted to rotate the adjustable-displacement pump 20 of the drive power transmission of the trailer 11. The adjustable-displacement pump 20 communicates through hydraulic lines with constant-displacement motors 21a and 21b, preferably hydraulic hub motors. The constant-displacement motors 21a and 21b drive the drive wheels 22a and 22b. The drive wheel 22a is fitted to rotate and to drive a crawler 23a or the equivalent, and, correspondingly, the drive wheel 22b is fitted to rotate and to drive the crawler 23b or the equivalent at the other side of the trailer 11.

Figure 3:
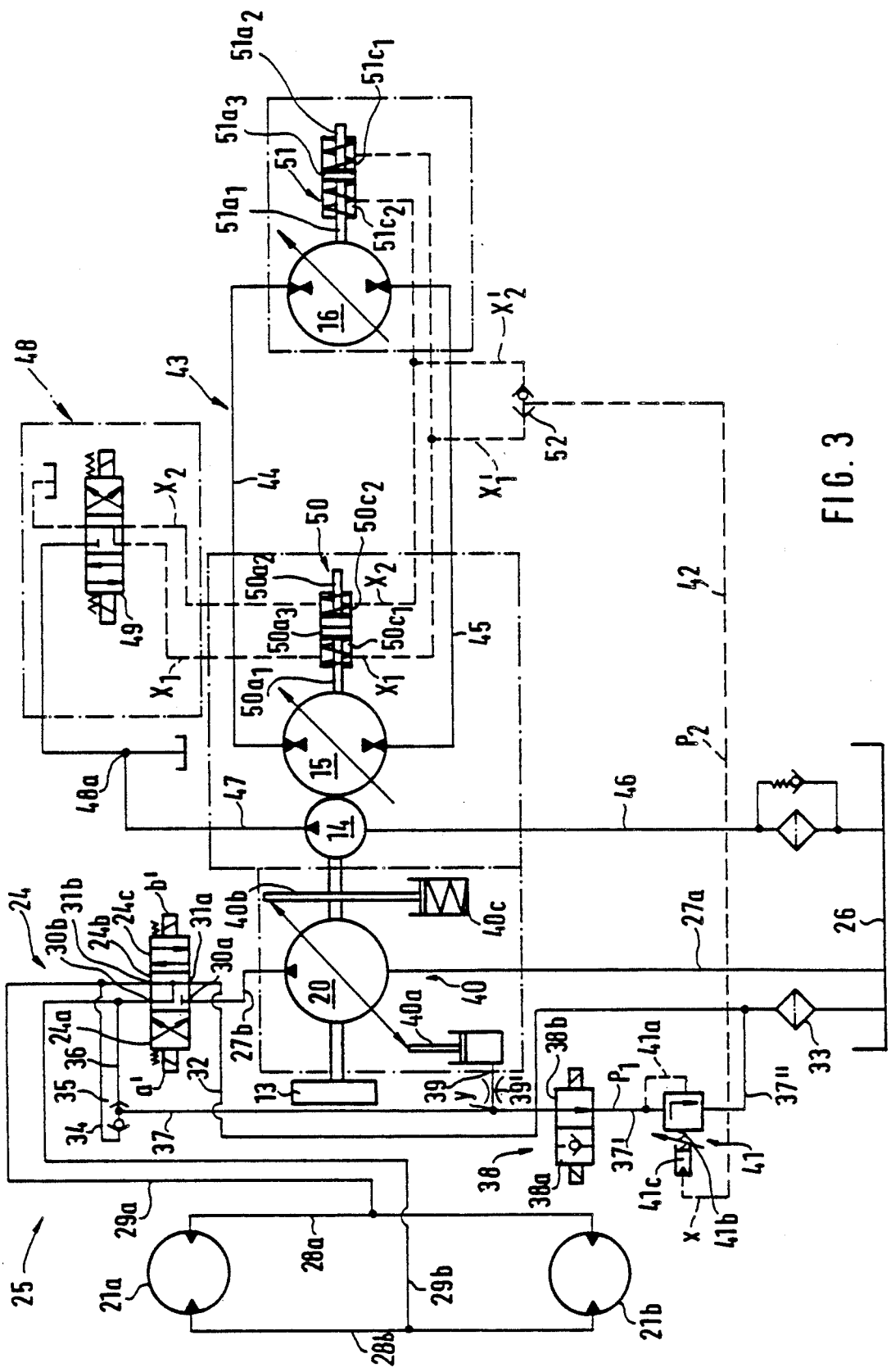
FIG. 3 shows the circuitry diagram of the hydraulic system of the drive power transmission system in accordance with the invention.

FIG. 3 is a schematical illustration of the automatic control system for the drive power transmission of the tractor and the trailer. The open pressure-medium circuit 25, preferably a hydraulic circuit, of the drive power transmission of the trailer 11 is provided with a directional valve 24 for the direction of rotation of the constant-displacement motors 21a and 21b.

The valve 24 is preferably a 4/3 directional valve. This means that the valve is provided with four connections and the valve comprises three blocks of operation: the blocks 24a, 24b and 24c. The valve 24 may be spring-loaded, whereby, when acting upon the controls a' and b', the valve spindle is displaced in either direction. When the control side a' is activated, e.g., by introducing the control voltages to the coil, the valve spindle is displaced so that the block 24a is switched on and, in a corresponding way, when the control side b' is activatd, the valve block 24c is switched on. In the middle position the springs keep the central valve block 24b switched on, i.e. in communication with the connections 30a, 30b,31a and 31b.

A pressure medium line 27a passes to the adjustable-displacement pump 20 of the drive power transmission of the trailer. From the pump, a pressure medium line 27b passes further to the valve 24. Between the constant-displacement motors 21a and 21b of the trailer, there is a first pressure line 28a and a second pressure line 28b. From the line 28a a line 29a is branched, and from the line 28b a line 29b is branched. The lines 29a and 29b communicate with the connections 30b and 31b of the valve 24.

When the middle block 24b in the valve 24 is on, the lines 29a and 29b are connected in the valve itself, and a return line 32 passes from the block 24b in the valve 24 to the line 26' to the fluid tank 26 through the filter 33. Thereat, the line 27b from the adjustable-displacement pump 20 is blocked.

When the valve 24 block 24a is on, a flow occurs the adjustable-displacement pump 20 from the line 27b to the line 29a. The return flow from the hub motors 21a and 21b comes along the line 29b to the return line 32.

Correspondingly, when the block 24b is on and connected to the connections 30a,30b;31a and 31b, the flow runs in the opposite direction, and the sense of rotation of the hub motors 21a,21b is now reversed as compared with the former case.

Also, from the line 29a there is a pressure line 34 to the change counter valve 35, and from the line 29b there is a pressure line 36 to the change-counter valve 35. From the change-counter valve 35 there is a pressure line 37, and the line 37 extends further to the blocking valve 38.

The blocking valve 38 comprises the blocks 38a and 38b. When the block 38a is switched on, the flow is blocked and the entire power is taken from the pump 20 at its maximum. Correspondingly, when the block 38b is switched on, the valve allows flow to pass through the valve. The control of the blocking valve 38 may be electric.

From the pressure line 37 that precedes the blocking valve 38 a line 39 is arranged which transfers the control pressure to the adjustable-displacement pump. The line 39 comprises a throttle 39', through which the control pressure is passed to the regulating unit 40 of the adjustable-displacement pump 20.

The regulating unit 40 may comprise an arrangement of equipment illustrated schematically in FIG. 3. The control pressure $p_1$ is passed to the piston device 40a regulating the output of the pump, which piston device 40a displaces the regulating disc in the pump, e.g. a disc that regulates the stroke volume of a piston pump, against the spring force of the spring 40c in the second piston device 40b, as a control (y) into the position determined by the control pressure $p_1$. When the control pressure $p_1$ is at its maximum e.g., in a case in which the blocking valves 38 allows a maximum control pressure to flow into the line 39, the adjustable-displacement pump 20 yields the maximum pressure.

In the line 37, after the blocking valve 38, there is a pre-controlled pressure-regulation valve 41. The pressure present in the line portion 37' opens the valve into the hydraulic line portion 37" placed after the valve. This pre-control is transmitted to the valve spindle of the pressure-limiter valve 41 or to its control along the line 41a. The pressure $p_1$ acts against the spring force of the spring 41b. The spring force of the spring 41b is separately adjustable. The valve spindle is acted upon further against the pre-control pressure $p_1$ by means of a regulating piston 41c, to which the control pressure $p_2$ is passed as a control quantity (x) along a pressure line, preferably a hydraulic pressure line 42. The pressure line 42 communicates with these control lines $x_1$ or $x_2$ of the closed pressure medium circuit 43 of the drive power of the tractor 10 through the change-counter valve 52 and the pressure medium lines $x_1'$ and $x_2'$. In this way, the control message (x) is transmitted as a modified control message (y) to the adjustable-displacement pump 20.

The closed circuit 43 of the drive power transmission of the tractor comprises an adjustable-displacement pump 15 and a constant-displacement-pump 14 rotated by the drive engine 13. The constant-displacement pump 14 transmits the feed pressure and the so-called pilot pressure, i.e. the control pressure, to the adjustable-displacement pump 15 of the power transmission of the tractor and to the adjustable-displacement motor 16. The adjustable-displacement pump 15 is fitted to operate the adjustable-displacement motor 16 of the power transmission of the tractor. In this way the adjustable-displacement pump and the adjustable-displacement motor are connected in parallel, and they are also interconnected as a closed circuit of high operating pressure by means of the pressure medium lines 44 and 45.

As shown in FIG. 3, pressure medium line 46 passes to the constant-displacement pump 14 from the line 26' to the fluid tank 26 (FIG. 2). From the pump 14 the pressure line 47 further extends. The pressure line 47 extends to the valve system 48 of the drive power transmission circuit of the tractor. The valve system 48 comprises a distribution point 48a, through which part of the flow is taken through a pressure distributor valve to the fluid line 26'. From the distribution point 48a, the control pressure is taken further for the pump 15 and 16 motor in the closed circuit 43. This control pressure is taken through the directional valve 49, which is a 4/3 directional valve and by means of which the control pressure $p_2$ is passed to the line $x_1$ or $x_2$. The control pressure $p_2$is passed both to the adjustable-displacement pump 15 and to the adjustable-displacement motor 16. The control pressure arrives either in the line $x_1$ or in the line $x_2$. The control pressure $p_2$ is applied to the adjustable-displacement pump 15 of the closed circuit 43 and to the adjustable-displacement motor 16 at the same time. The adjustable-displacement pump 15 comprises a regulation unit 50, which regulates the output and the pressure of the adjustable-displacement pump 15, and, correspondingly, the adjustable-displacement motor 16 comprises a regulation unit 51, which regulates the blade angle or equivalent, for example in the case of a piston motor, the stroke length of the piston, of the adjustable-displacement motor. These regulation units are illustrates schematically in FIG. 3. They may consist, e.g., of the following basic components of construction. The adjustable-displacement unit 50 may comprise a piston device shown in the figure, which comprises a piston rod $50a_1$ and $50a_2$ and, between them, a piston $50a_3$. Each piston rod $50a_1$ and $50a_2$ is fitted to be surrounded by a spring. When the control pressure $p_2$ is applied neither to the line $x_1$ nor to the line $x_2$, the piston $50a_3$ is kept by the springs in its middle position, and thereat the displacement of a adjustable-displacement pump 15 is at the minimum and it produces its minimum flow quantity. The direction of the flow of the fluid that is made to flow by means of the pump is affected by whether the control pressure is applied to the line $x_1$ or to the line $x_2$. The adjustable-displacement motor 16 connected in parallel thereto is regulated in a corresponding way. The regulating unit 51 for the adjustable-displacement motor 16 may comprise components of construction corresponding to those in the adjustable-displacement unit 50. As is shown in the figure, the adjustable-displacement unit 51 comprises a piston $51a_3$ and the piston rods $51a_1$, $51a_2$, around which there is a spring. The regulating unit 50 comprises medium spaces $50c_1$ and $50c_2$, wherein the spring elements are placed. In a corresponding way, the regulating unit 51 of the motor 16 comprises medium spaces $51c_1$ and $51c_2$, wherein the spring elements are placed. The control pressure is passed along the pressure line $x_1$ both into the medium space $50c_1$ of the regulating unit 50 and into the medium space $51c_1$ of the regulating unit 51, or along the line $x_2$ into the medium spaces $50c_2$ and $51c_2$. The pressure from the line $x_1$ is passed along the line $x_1'$ to the change-counter valve 52 and from the line $x_2$ along the line $x_2'$ to the change-counter valve 52. From the change-counter valve 52, a pressure line 42 passes further to the pressure-limiter valve 41, to its regulating piston 41c.

Figure 4:
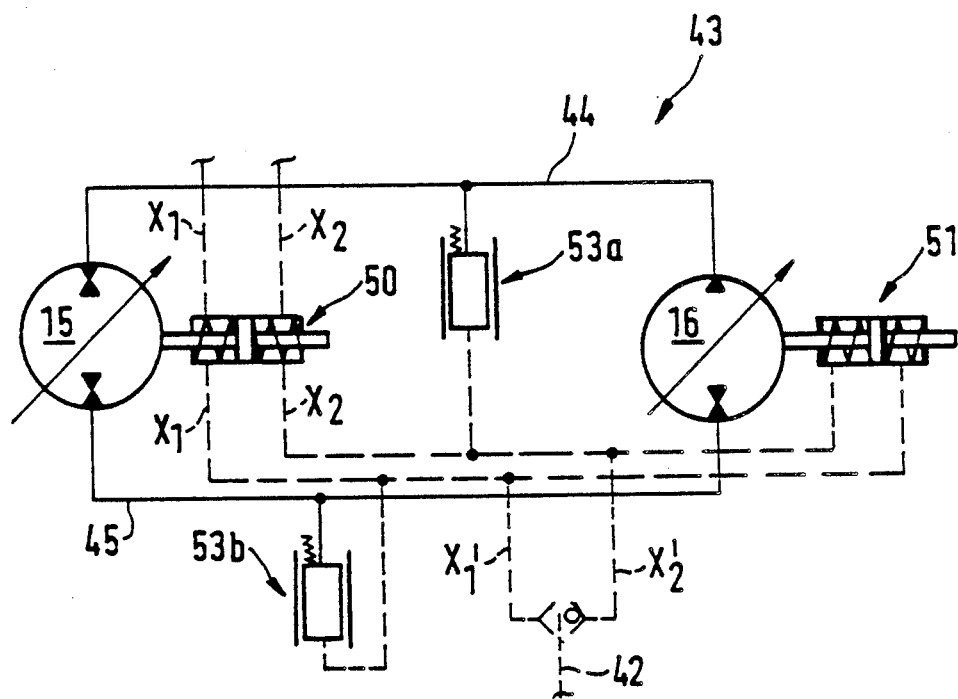
FIG. 4 illustrates the principle of a solution in which a closed circuit transfers the closed-circuit pressure, resulting from the loading, to the control-pressure circuit.

FIG. 4 is an illustration of the principle of the transmission of the change in the pressure, resulting from the loading, to the control pressure circuit. The arrangement of equipment is in itself known, and this regulating can be accomplished by means of various arrangements of equipment. The devices 53a and 53b that transmit the change in pressure in the circuit comprise a piston device to one of whose sides the pressures in the closed circuit is passed, whereas the pressure of the control circuit is passed to the other side. The control circuit is fitted to press the piston against the spring force. When the pressure is increased in the closed circuit, this pressure is applied to the piston. The piston moves and causes a pressure increase in the control circuit $x_1$ or $x_2$. In this way, a change in pressure resulting from the loading is transmitted directly to the drive-power regulating circuit of the trailer.

The pressure prevailing in the lines $x_1$ and $x_2$ is proportional to the drive resistance of the tractor. When the drive resistance increases. e.g. when driving steeply uphill, the pressure in the line $x_1$, when driving forwards, increases and acts upon the regulating piston 41c so that the pressure value in the pressure-limiter valve 41 increases. Thereat the pressure in the line 39 increases and acts upon the regulator of the pump 20 so that the pressure value produced by the pump becomes higher, whereby the torque of the motors 21a and 21b is increased. In a corresponding way, the opposite takes place when the drive resistance is lowered. When operating in the way described above, the regulating system ensures that, when necessary, the power transmission of the trailer automatically contributes to the pushing force and lowers the pushing force, respectively, when the drive resistance becomes lower. In the invention, in the way described above, the closed and the open hydraulic circuits are interconnected so that the pump displacement per revolution and the pressure in the open circuit are regulated by means of a pressure-controlled pressure limiter valve 41. This valve 41 receives its control from the circuit $x_1$ or $x_2$ that regulates the displacement per revolution of the pump and the motor in the closed circuit. The pressure prevailing in the circuits is also proportional to the drive resistance of the tractor 10. Thus, by means of the system in accordance with the invention, a regulation of the torques of the hub motors 21a and 21b of the trailer in proportion to the drive resistance is achieved.

Figure 5:
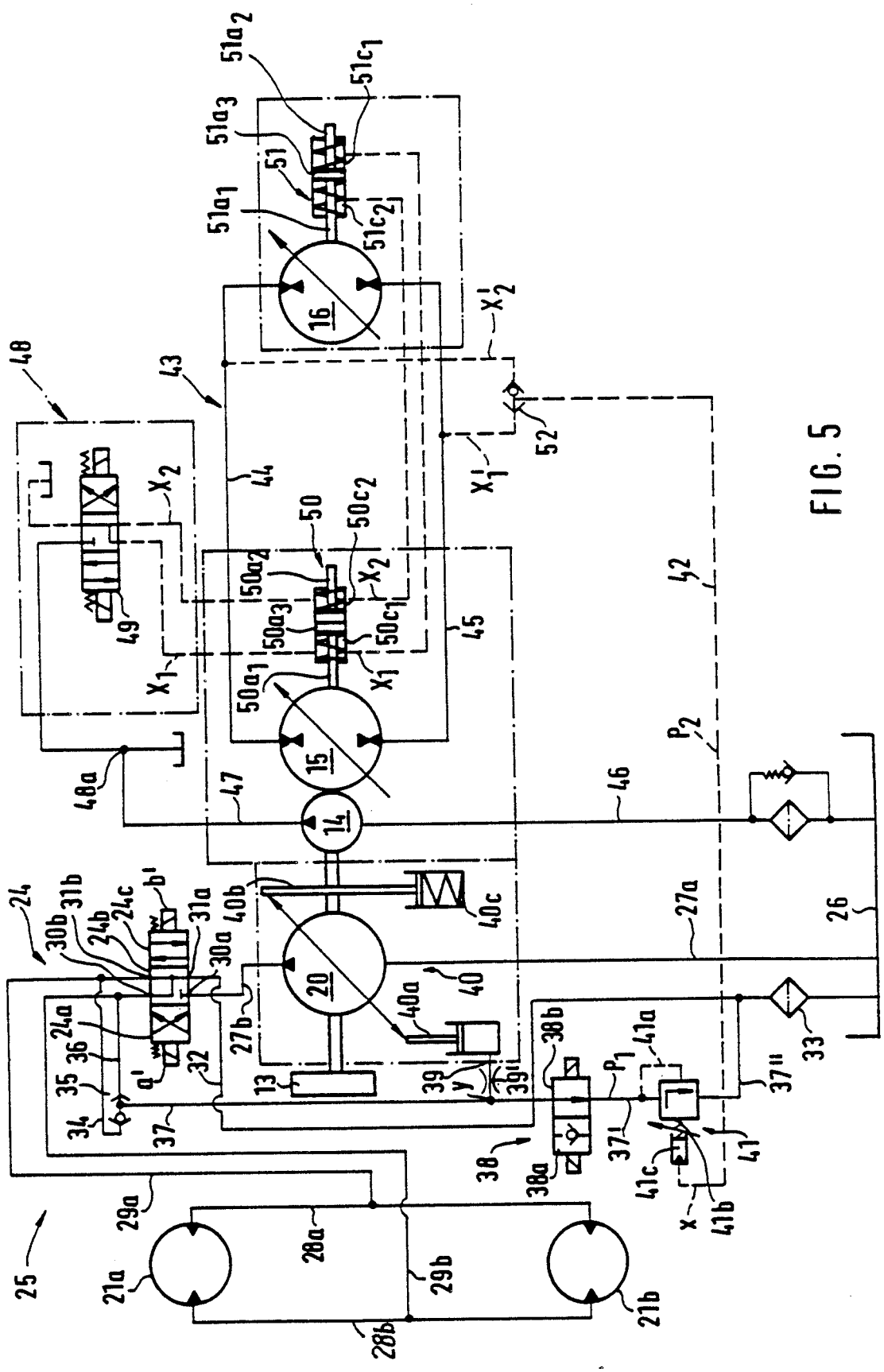
FIG. 5 shows the circuitry diagram of a second embodiment of the hydraulic system of the drive power transmission system in accordance with the invention.

FIG. 5 illustrates a second advantageous embodiment of the automatic control system for the transfer of drive power in accordance with the invention as well as a hydraulic circuitry diagram therefor. The embodiment shown in FIG. 5 differs from the embodiment of FIG. 3 in only that the control data from the closed circuit to the open circuit are transferred from the main hydraulic line 44,45 between the pump 15 of the closed hydraulic circuit and the motor 16.

From the change-counter valve 52, there is a line $x_1''$ to the line 45 between the pump 15 and the hydraulic motor 16 and a line $x_2''$ to the line 44 between the pump 15 and the motor 16.

Thus, the control pressure is transmitted either from the line 44 or from the line 45 to the pressure-limiter valve 41 and to its regulating piston 41c. The pressure-limiter valve 41 closes and opens the main flow that flows through the valve. When the valve 41 is being closed, the pressure is increased in the line 39 that passes to the pump 20 control unit 40, and the pressure produced by the pump 20 is increased and, in a corresponding way, when the control pressure becomes lower in the line $x_1''$ or $x_2''$, the control pressure in the line 39 also becomes lower, and thereat the pump 20 is fitted to transmit a lower pressure to the motors 21a,21b of the drive wheels. Thus, the control system illustrated in FIG. 5 differs from the control system shown in FIG. 3 in the respect only that the control data are transmitted to the valve 41 directly from the operating-pressure line between the pump 15 and the motor 16 in the closed hydraulic circuit.

What is claimed is:

1. An automatic control system for the transfer of drive power between a tractor and a trailer, said system comprising a closed hydraulic circuit which operates a set of drive wheels integral to said tractor and an open hydraulic circuit which operates another set of drive wheels integral with said trailer, said closed hydraulic circuit comprising:
   an adjustable displacement pump; and
   a motor driven by said adjustable displacement pump; and said open hydraulic circuit comprises:
   another adjustable displacement pump;
   at least one other motor driven by said another adjustable displacement pump; and
   a pressure-limiter valve; and said system further comprises:
   a fluid containing line connected to said closed hydraulic circuit and, through said pressure-limiter valve, to said open hydraulic circuit, said line functioning to transmit fluid pressure from said closed hydraulic circuit to said open hydraulic circuit in such a manner that, when fluid pressure changes in magnitude within said closed hydraulic circuit a corresponding change in fluid pressure magnitude occurs within said open hydraulic circuit such that said another hydraulic pump delivers a corresponding change in pressure to said at least one other motor in a manner such that, with increasing traction resistance to said set of drive wheels integral to said tractor, said fluid pressure in said fluid containing line increases and said increased fluid pressure is transmitted through said pressure-limiter valve to said adjustable displacement pump which in turn produces a higher drive pressure for said at least one other motor and, in a corresponding way, with decreasing traction resistance to said set of drive wheels integral to said tractor, said fluid pressure in said fluid containing line decreases and said decreased fluid pressure is transmitted through said pressure-limiter valve to said adjustable displacement pump which in turn produced a lower drive pressure for said at least one other motor.

2. Control system as claimed in claim 1, wherein the control system further comprises other fluid containing lines ($x_1$ and $x_2$) that transmit the control pressure to said adjustable displacement pump and to said motor and from which said lines the control pressure is also transmitted along said fluid containing lines and said other fluid containing lines to said pressure-limiter valve of said open circuit and said valve comprising a regulating piston to which said control pressure is transmitted by said lines, such that when said pressure increases, said pressure-limiter valve partially closes the fluid flow passing through said valve, such that, when said valve is being closed, pressure rises in the line (39) passing to the pump (20) regulating unit (40), and said system comprises another fluid containing line in which pressure rises and passes to said another adjustable displacement pump which comprises a regulation unit by means of which the pressure produced by said another adjustable displacement pump (20) becomes higher and, in a corresponding way, as the control pressure becomes lower in said other fluid containing lines, the control pressure in said another fluid containing line also becomes lower, and thereby the another adjustable displacement pump is adapted to produce a lower pressure for said at least one other motor.

3. Control system as claimed in claim 1, wherein, in the closed hydraulic circuit of the tractor, the adjustable-displacement pump is connected to rotate the motor and that the adjustable-displacement pump is adapted to be rotated, said tractor further comprising a drive engine which produces said rotation and said tractor further comprising a constant-displacement pump, which said drive engine also rotates said constant-displacement pump (14), said closed circuit comprising at least one actuator, the control pressure for which is produced by said constant-displacement pump along a respective one of said other fluid-containing lines.

4. Control system as claimed in claim 1, wherein working pressure for the open circuit of the trailer is produced by said another adjustable-displacement pump, which is fitted to rotate said at least one other motor, and wherein the drive of rotation for said another adjustable-displacement pump (20) is brought from the drive engine (13) of the tractor (10).

5. Control system as claimed in claim 1, further comprising said adjustable displacement pump comprising a pair of regulation units for control of the adjustable-displacement pump and of the thereto connected adjustable-displacement motor in the closed circuit of the tractor, said control being transmitted along said other fluid containing lines to the pair of regulation units both for control of said adjustable-displacement pump and of said adjustable-displacement motor.

6. Controls system as claimed in claim 1, further comprising another valve, and further comprising another line which can be blocked by said another valve such that the pump can be made to supply maximum pressure to hydraulic motors said at least one motor.

7. Control system as claimed in claim 2, wherein pressure is passed to said pressure-limiter valve of the open circuit and to said piston of said valve, said system further comprising a pair of liens between said pump and said motor in the closed hydraulic circuit, and said system further comprising a change-counter valve, whereby the pressure in the line of said pair of lines whose pressure is higher is transmitted through said change-counter valve (52) to said fluid containing line (42) and further to said pressure-limiter valve of the open circuit and to said regulating piston, such that, when said pressure becomes higher, said pressure-limiter valve reduces said fluid flowing through said valve, such that, when said valve (41) is being closed, and said system further comprises yet another line and the pressure in said yet another line that passes to said control unit of the another adjustable displacement pump becomes higher, and, in a corresponding way, when the control pressure becomes lower in said fluid-containing line, the control pressure also becomes lower in said yet another line, and thereby the pump (20) is caused to supply a lower pressure to said at least one other motor of the drive wheels.

* * * * *